United States Patent
Dougherty et al.

(10) Patent No.: US 7,002,996 B1
(45) Date of Patent: Feb. 21, 2006

(54) SYSTEM AND METHOD FOR SWITCH TIMING SYNCHRONIZATION

(75) Inventors: David Thomas Dougherty, San Diego, CA (US); Philip Michael Clovis, San Diego, CA (US)

(73) Assignee: Applied Micro Circuits Corporation, San Diego, CA (US)

( * ) Notice: Subject to any disclaimer, the term of this patent is extended or adjusted under 35 U.S.C. 154(b) by 820 days.

(21) Appl. No.: 09/829,214

(22) Filed: Apr. 9, 2001

(51) Int. Cl.
*H04J 3/06* (2006.01)

(52) U.S. Cl. ...................................... 370/503
(58) Field of Classification Search ............... 370/360, 370/375, 462, 463, 503
See application file for complete search history.

(56) References Cited

U.S. PATENT DOCUMENTS

| | | | |
|---|---|---|---|
| 5,796,795 A | 8/1998 | Mussman et al. | |
| 6,188,687 B1 | 2/2001 | Mussman et al. | |
| 6,229,886 B1 * | 5/2001 | Moody et al. | 379/219 |
| 6,266,338 B1 * | 7/2001 | Simon et al. | 370/412 |
| 6,578,092 B1 * | 6/2003 | Lau et al. | 710/29 |
| 6,621,828 B1 * | 9/2003 | Field et al. | 370/466 |
| 6,711,028 B1 * | 3/2004 | Iny | 361/788 |
| 6,760,586 B1 * | 7/2004 | Lee | 455/436 |

\* cited by examiner

*Primary Examiner*—Kwang Bin Yao
(74) *Attorney, Agent, or Firm*—Incaplaw; Terrance A. Meador (57) ABSTRACT

A system and method have been provided for synchronizing the timing of line cards and switch cards in a broadband switch. Synchronization is accomplished using an auxiliary data link between the line and switch cards. One of the switch cards is selected as the master switch card. The master switch card receives timing information from the line cards, and in turn, sends timing correction signals to each of the line cards. Each line card acquires synchronization using its respective timing correction. A master line card is selected from among the line cards, and the slave switch cards adopt the timing of the master line card, becoming synchronized to the master switch card.

20 Claims, 6 Drawing Sheets

SYSTEM AND METHOD FOR SWITCH TIMING SYNCHRONIZATION

BACKGROUND OF THE INVENTION

1. Field of the Invention

The invention relates generally to broadband switch architecture and, more particularly, to a system and method for synchronizing the timing between line cards and switch cards in a broadband switch.

2. Description of the Related Art

As noted in U.S. Pat. No. 6,188,687 (Mussman et al.), networks transfer electronic information between different locations. Broadband networks may convey broadcast-like video distribution, individual access to video program libraries, video telephone, video conferencing, and the like. Any one of such services may, for example, communicate signals having data transfer rates higher than 50 Mb/s.

In order to effectively serve a large number of customers, a broadband network includes switching nodes. At switching nodes, broadband signals are routed along selected paths so that desired signals are delivered from signal sources to targets (destinations). Numerous problems are faced by a broadband, real-time switch that accommodates a large number of connections. These problems result, at least in part, from the high data transfer rates associated with broadband communications. In short, a tremendous amount of data need to be processed or otherwise transferred through the switch during every unit of time, and the larger the number of connections supported by the switch, the greater the amount of data which need to be processed.

A practical broadband switch should be able to efficiently support a variety of communication services, whether or not such services require unidirectional or bidirectional signal traffic. For example, bidirectional services such as video conferencing and other interactive services that utilize point-to-point connections. Unfortunately, switching systems designed to efficiently handle broadcast-like communications may not be capable of efficiently supporting bidirectional signal traffic, and vice versa. Such systems may not be able to adapt to long term trends in upstream and downstream signal traffic demand. In addition, conventional network switches may not be able to adapt to large or rapid variations in the amount of upstream versus downstream traffic.

An adaptable network switch may require less switching hardware than a rigidly designed switch having equivalent switching capabilities. A reduction in the number of physical components is desirable to conserve space and to lower engineering, manufacturing, and maintenance costs. For example, given a specific mix of upstream and downstream switching capacities, a switching circuit that adapts to upstream and downstream traffic volume requires fewer components than an equivalent switching circuit that employs a fixed number of upstream circuits and a fixed number of downstream circuits. If the actual volume of upstream and downstream traffic is not proportional to the respective number of fixed upstream and downstream circuits, then the circuits are not optimally allocated and switching capacity is wasted.

Switching capacity is also wasted when communication signals are delivered to a network switch without being requested from a downstream customer. Switching circuits become busy with signal traffic and the probability of blocking increases when signals are unnecessarily brought down to the network switch. The frequency of signal blocking can also increase if traffic volume is not evenly distributed among unoccupied or sparsely-occupied switching circuits. In addition, switching speed may be sacrificed if the network switch distributes signal traffic in a random or unstructured manner.

As noted in U.S. Pat. No. 5,796,795 (Mussman et al.), at broadband data rates, every data signal path within the switch acts like a transmission line having a delay proportional to its length and being subject to interference from signals which can cause timing or phase distortions. Thus, each data signal transferred through the switch has an optimum bit synchronization timing arrangement which defines when data can most reliably be extracted from the data signal's path. Moreover, this timing may vary from signal to signal, depending upon the physical connection path a given data signal follows through the switch at any given moment. If a clock signal is used to define bit timing for the signals, then the clock signal also experiences its own such distortions. Thus, optimal clocking in spite of timing distortions in data and clock paths is difficult to achieve over a large number of connections.

Furthermore, physically larger switches experience worse timing distortions because physically larger switches have longer signal paths. Propagation delays vary from signal to signal and clock to clock through switch fabric components and/or the transmission line signal paths that interconnect the components.

One conventional solution to the timing problem is to extract a clock signal from each data signal path at the points in the switch where the data need to be extracted. However, this solution is undesirably complex because it requires one or more clock recovery circuits associated with each data signal path, and the complexity increases as the number of connections increases. Consequently, this solution leads to decreased reliability and increased cost. Moreover, the increased complexity necessitated by an excessive number of clock recovery circuits requires physical switch power consumption and implementation space to increase, and these increases further exacerbate the timing problem.

Another conventional solution to the timing problem is to process data in parallel rather than serially. For example, rather than switch single-bit serial data streams at a bit rate, a "parallel" switch can switch two-bit serial data streams at one-half the bit rate to achieve the same data throughput or more than two-bit serial streams at even lower bit rates to achieve the same data throughput. Unfortunately, this solution increases complexity by requiring proportionally more at least twice the number of components and interconnections, and it further exacerbates the timing problem by requiring proportionally more physical implementation space.

A switch or a switching node as defined herein includes at least two major components. They are line cards, connected to other switching nodes or destinations to transmit and receive information packets, and switch cards to transfer the information packets between the line cards. Each switch card typically includes a crossbar switch, or series of parallel crossbar switches having a plurality of inputs and outputs that can connected upon command. The line cards are linked through the switch card crossbars. Each switch card includes an associated arbiter to make the crossbar connection decisions.

A number of problems can result if proper synchronization is not maintained between the line cards and switch cards. For example, the requests to the switch cards from the line cards, to access a crossbar connection to another line card, require that the timing between the line cards and switch cards be synchronized. Likewise, the acknowledgements from the switch cards to the line cards require synchronized communications. The transfer of information by frames, and the tracking of the frames being transferred requires a common timing base between line and switch cards. Further, a line card may service the various crossbars of a switch card in a round robin type fashion, which once again requires synchronization. In applications that reserve bandwidth, with preprogrammed connections that bypass the bid request/acknowledgement handshaking, synchronized timing becomes even more critical.

It would be advantageous if line cards could be synchronized to switch cards without adding additional overhead to the information link between the cards. Further it would be advantageous if the synchronization could be performed on an auxiliary communication link between the line cards and the switch cards.

It would be advantageous if line cards could be replaced and resynchronized without reinitializing the switch host.

It would be advantageous if switch cards could be replaced and resynchronized without reinitializing the switch host.

SUMMARY OF THE INVENTION

Accordingly, a method is provided for synchronizing timing in the transfer of information across a switch. The method comprises: designating a master switch card, having a master switch timing reference, from a plurality of switch cards; from the plurality of line cards, designating a master line card and slave line cards; synchronizing a plurality of line cards for transceiving information packets in response to communications with the master switch card; and, synchronizing a plurality of switch cards, controlling the distribution of the information packets, in response to communications with the master line card.

The plurality of switch cards are synchronized in response to communications conducted exclusively with the line cards. Likewise, the line cards are synchronized in response to communications conducted exclusively with the switch cards.

More specifically, synchronizing line cards in response to communications with the master switch card includes the sub-steps of: receiving timing signals at the master switch card from each of the line cards; and, sending timing corrections from the master switch card to each of the line cards. Synchronizing the slave switch cards to the master switch timing reference in response to communications with the master line card includes the sub-steps of: each slave switch card receiving a timing signal, with a local timing reference synchronized to the master switch timing reference, from the master line card; and, each slave switch card synchronizing its respective slave switch timing reference to the received local timing reference.

Additional details of the above-described timing synchronization method and a system for synchronizing line cards and switch cards in a broadband switch are provided below.

DETAILED DESCRIPTION OF THE PREFERRED EMBODIMENTS

Figure 1:
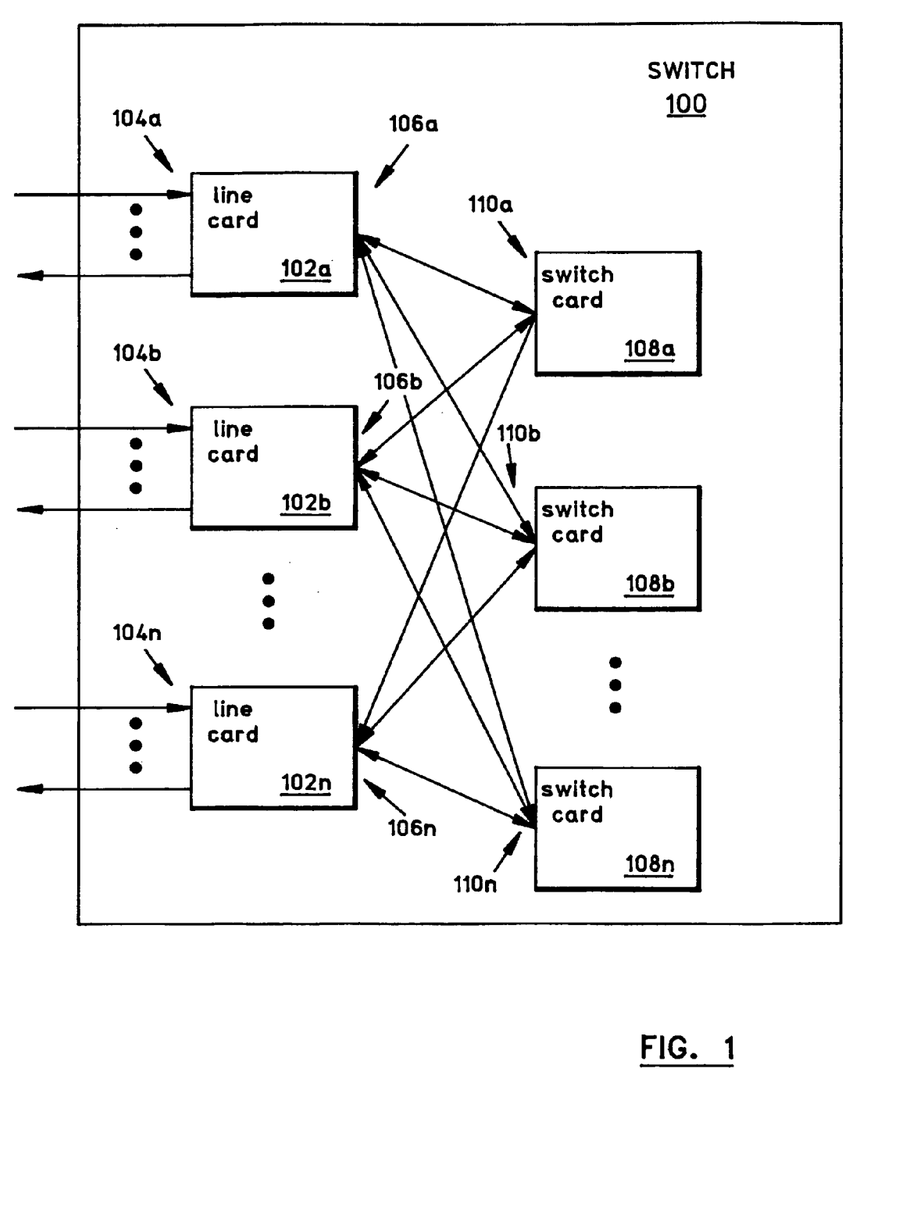
FIG. 1 is a schematic block diagram of a system for synchronizing switch timing.

FIG. 1 is a schematic block diagram of a system for synchronizing switch timing. The switch system 100 comprises a plurality of line cards 102a, 102b, through 102n. Although three line cards are depicted, the invention is not limited to any particular number of line cards. Each line card 102a–102n has an information port 104a, 104b through 104n, respectively, to transmit and receive information packets. For simplicity, the left side (information port) of each of the line cards 102a–102n is shown as having a single line to receive information and a single line to transmit information packets. However, the invention is not limited to any particular number of input or output lines. Further, there need not be any correlation between the number of input lines and the number of output lines.

Generally, the switch accepts information packets from a plurality of sources addressed to a plurality of destinations. The switch 100 acts to route communications from a source to a destination. Typically, there is contention between a number of information packets addressed to a common destination. Switching decisions are made at the level of individual information packets, or upon cells within information packets.

Each line card 102a–102n has a control port 106a, 106b, through 106n, respectively, to accept commands for controlling the distribution of the information packets. Each line card 102a–102n maintains synchronization in response to timing signals communicated through their respective control port 106a–106n.

The switch system 100 further comprises a plurality of switch cards 108a through 108n. As depicted, the number of switch cards equals the number of line cards. However, the invention is not limited to any particular number of switch cards, and the number of switch cards need not necessarily match the number line cards. Each switch card 108a–108n has a control port 110a through 10n, respectively, connected to the plurality of line cards 102a–102n to send information packet control commands. Each switch card 108a–108n maintains synchronization in response to timing signal communications with the line cards through their respective control ports 110a–110n.

The plurality of switch cards 108a–108n include a master switch card, having a master switch timing reference, and slave switch cards. For the purpose of demonstration, switch card 108a is selected as the master switch card, and switch cards 108b and 108n as the slave switch cards. The selection of the master switch card 108a can be the result of external control (not shown), random selection, priority ranking among switch cards, or even a round-robin priority method. The selection process is not critical to the invention. Regardless of the selection criteria, the line cards 102a–102n maintain synchronization in response to timing signal communications with the master switch card (hereafter it is assumed that the master switch card is switch card 108a).

Likewise, the plurality of line cards 102a–102n include a master line card and slave line cards. Again, a number of selection processes are possible, and for the following explanation it is assumed that line card 102a is the master line card. The slave switch cards 108b and 108n maintain synchronization in response to timing signal communications with the master line card 102a.

In one aspect of the invention, as depicted, the switch card control ports 110a–110n are connected exclusively to line card control ports 106a–106n. Alternately stated, there are no timing synchronization connections between switch cards 108a–108n. Further, there are no connections or direct communications between line cards 102a–102n. The master switch card 108a receives timing signals from each of the line cards 102a–102n, and sends timing corrections to the line cards.

More specifically, the master switch card 108a receives a timing signal including a local timing reference from each of the line cards 102a–102n. The master switch card 108a compares the local timing reference from a particular line card to the master switch timing reference, creates a timing offset between the local timing reference and the master switch timing reference, and supplies the timing offset in a timing signal to the line card. Then, that particular line card modifies its local timing reference in response to receiving the timing signal with the timing offset from the master switch card 108a.

Figure 2:
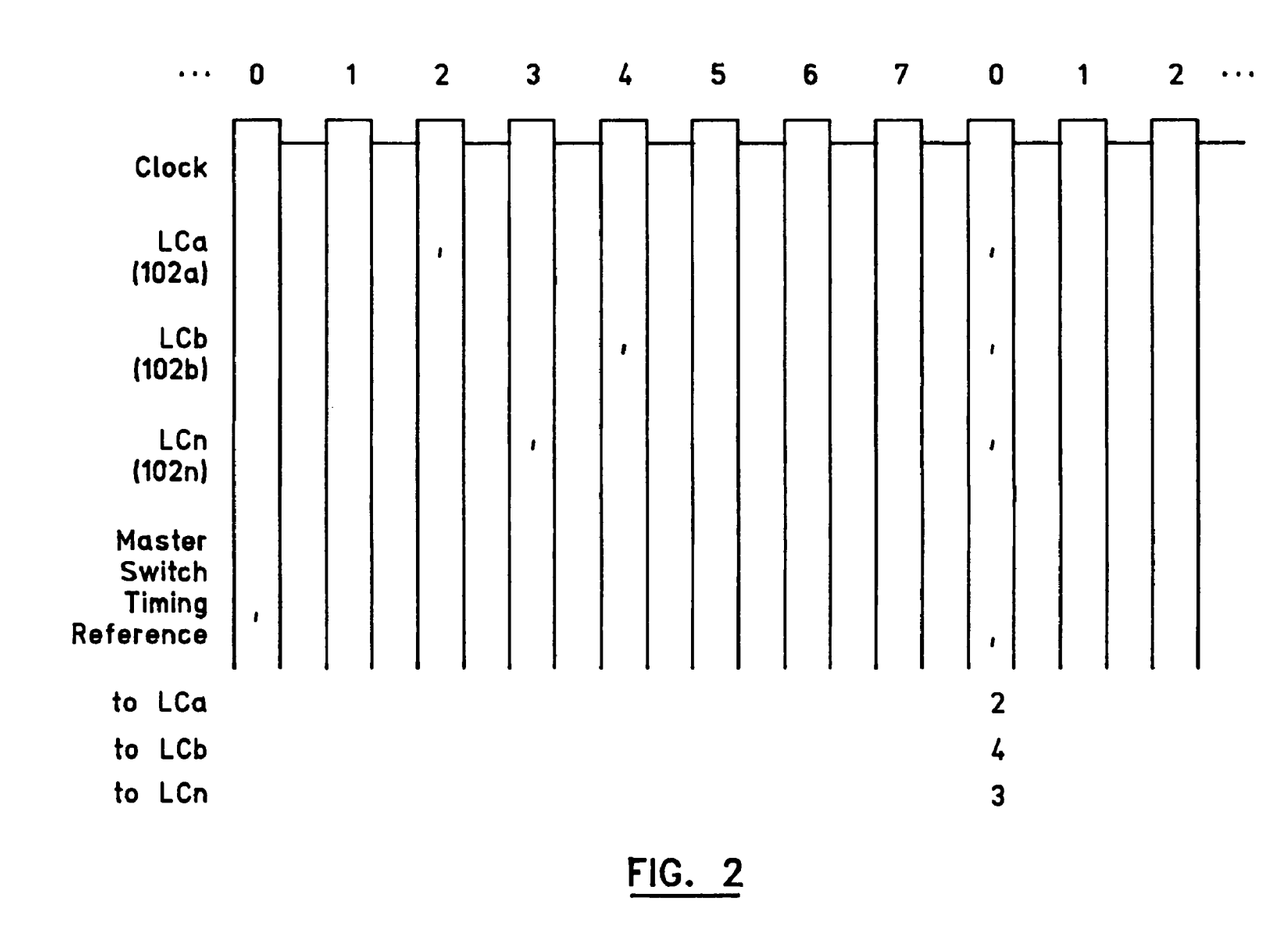
FIG. 2 is a timing diagram illustrating the relationship between the master switch timing reference and the local timing references.

FIG. 2 is a timing diagram illustrating the relationship between the master switch timing reference and the local timing references. As shown in reference to a clock signal, the master switch timing reference generates a timing reference in cycle 1 of a periodic cycle of clock pulses. For simplicity, a period of eight clock cycles in shown. However, the number of cycles in a period is typically related to the product of the number of crossbars in a switch card, the number of cells in an information packet frame, and the number of cycles in a bid accept frame. The timing reference signal is represented by the comma symbol ",". The master switch receives a local timing reference in cycle 2 from line card 102a (LCa). The master switch also receives a local timing reference signal in cycles 3 and 4 from line cards (LCn) 102n and (LCb) 102b, respectively. The master switch sends a signal to line card 102a with a timing offset of 2. A timing offset of 4 and 3 are sent to line cards 102b and 102n, respectively. The individual line cards add their respective timing offsets to their counts to become synchronized with the master switch timing reference. For example, at clock cycle 0, line cards 102a adds to 2 to its current count of 6 (6 clock periods since its own local timing reference ",") to yield a 8, or 0 in the periodic base 8 clock. At clock cycle 0, the master switch timing reference also has a count of 0 so the local timing reference of line card 102a becomes synchronized to the master switch timing reference. Line cards 102b and 102n are synchronized in the same manner.

Each slave switch card 108b and 108n receives a timing signal, with a local timing reference synchronized to master switch timing reference, from the master line card 102a. Each slave switch card 108b and 108n adopts the local timing reference of the master line card 102a as the slave switch timing reference.

Figure 3:
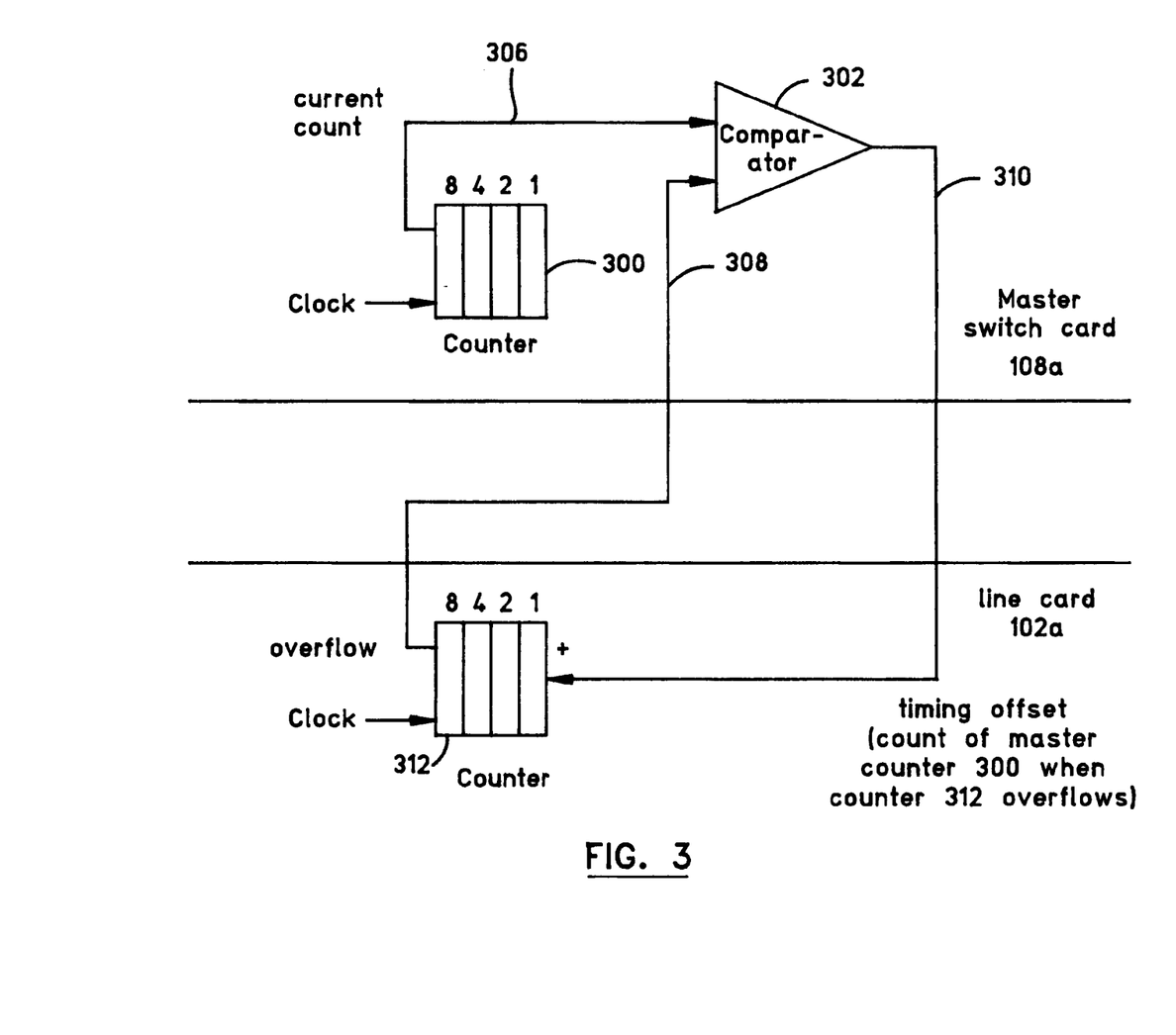
FIG. 3 is a schematic block diagram illustrating specifics of the line card and switch card timing elements.

FIG. 3 is a schematic block diagram illustrating specifics of the switch card and line card timing elements. Each switch card includes a counter to generate a timing reference that is the overflow count of a first predetermined number at a first predetermined rate. As shown, the master switch counter 300 is a four-bit binary counter operating the same rate as the clock of FIG. 2. The counter increments a count every clock cycle, and when the count exceeds 8 (1111), an overflow occurs and the counter is reset to zero (0000). Likewise, each line card includes a counter to generate a timing reference that is the overflow count of a first predetermined number at a first predetermined rate.

The master switch card 108a uses its overflow count as the master switch timing reference. Thus, the "," generated by the master switch timing reference in FIG. 2 is the result of the master switch card counter overflowing in clock cycle 0. It should be noted that there is no particular relationship between the counter phase (the overflow count) and any particular clock cycle. That is, the master timing reference need not occur at clock cycle 0. The master switch 108a compares its count to each line card when it overflows, generating the "," symbol, notes the difference between the master switch count and each line card overflow count, and supplies each line card its respective measured difference as the timing offset.

As shown, a comparator 302 has an input on line 306 to accept the master switch card count and an input on line 308 to accept the overflow count from line card 102a. The counts are compared to yield the timing offset on line 310. In some aspects of the invention, the comparator is a adder circuit that adds the counts of the master switch counter 300 to the line card overflow count (of 0) and yields a sum on line 310 that is the current count of the master switch counter 300.

As explained above, each line card can be considered to have an adding function that adds its respective measured difference (timing offset) to its counter, to yield a synchronized count. Referring again to FIG. 3, line card 102a has a counter 312 to supply an overflow count on line 308. Line card 102a accepts the timing offset on line 310, and the timing offset is added to the counter 312, so the counts of counters 300 and 312 agree. An equivalent operation is carried out for the other line cards 102b and 102n.

Figure 4:
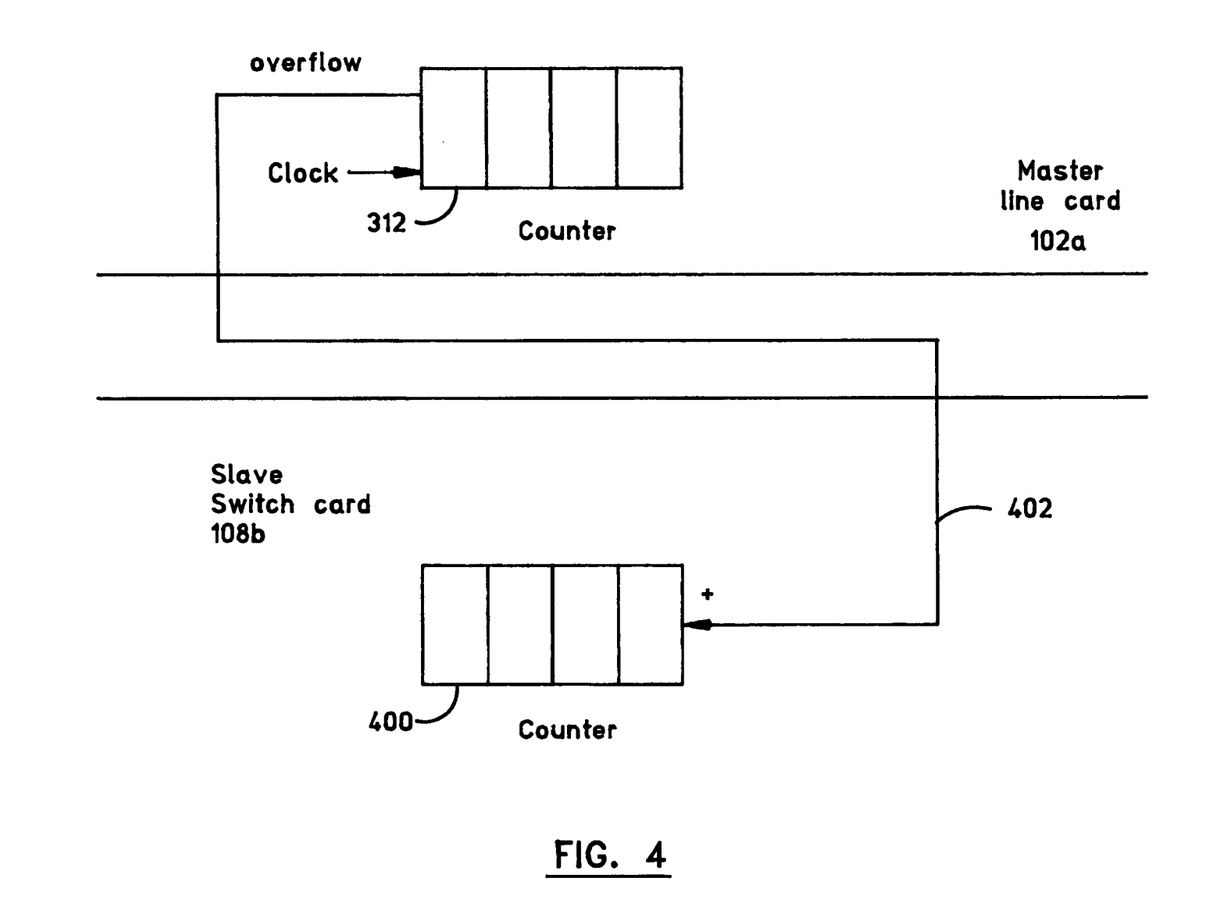
FIG. 4 is a schematic block diagram illustrating the specifics of the slave switch card synchronization process.

FIG. 4 is a schematic block diagram illustrating the specifics of the slave switch card synchronization process. The master line card counter 312 generates an overflow that is now synchronized to the overflow count of the master switch counter 300 (see FIG. 3). This overflow count is received by all the slave switch cards, slave switch card 108b is shown as an example. The counters or equivalent timing circuits of the slave switch card are synchronized to the overflow count on line 402. Alternately, master line card counter 312 has an output to provide its current count on line 402 and the slave switch counter 400 just adopts the current count provided by counter 312.

Some of the advantages of the invention are the ease of initialization and replacement of either line or switch cards. For example, when the line cards and switch cards are initialized at start up, the master switch card counter 300 is initialized. The initial value chosen for the count can be arbitrary. Then, the line cards are synchronized with timing signal communications responsive to the initialized master switch card counter.

If the master switch card is turned off after synchronizing the line cards, or the master switch card becomes non-functional, an alternate switch card can be selected as the master switch card from the plurality of slave switch cards, and the selected master switch card maintains the master switch timing reference. A variety of processes may be used to select the new (alternate) master switch card. The plurality of line cards maintain synchronization in response to timing signal communications with the alternate master switch card.

Likewise, if the master line card is turned off after synchronizing the slave switch cards, or if the master line card becomes non-functional, an alternate line card is selected as the master line card from the plurality of slave line cards, and maintains synchronization with the master switch card. Again, the specific selection process is not critical. The slave switch cards maintain synchronization in response to timing signal communications with the alternate master line card.

Figure 5A:
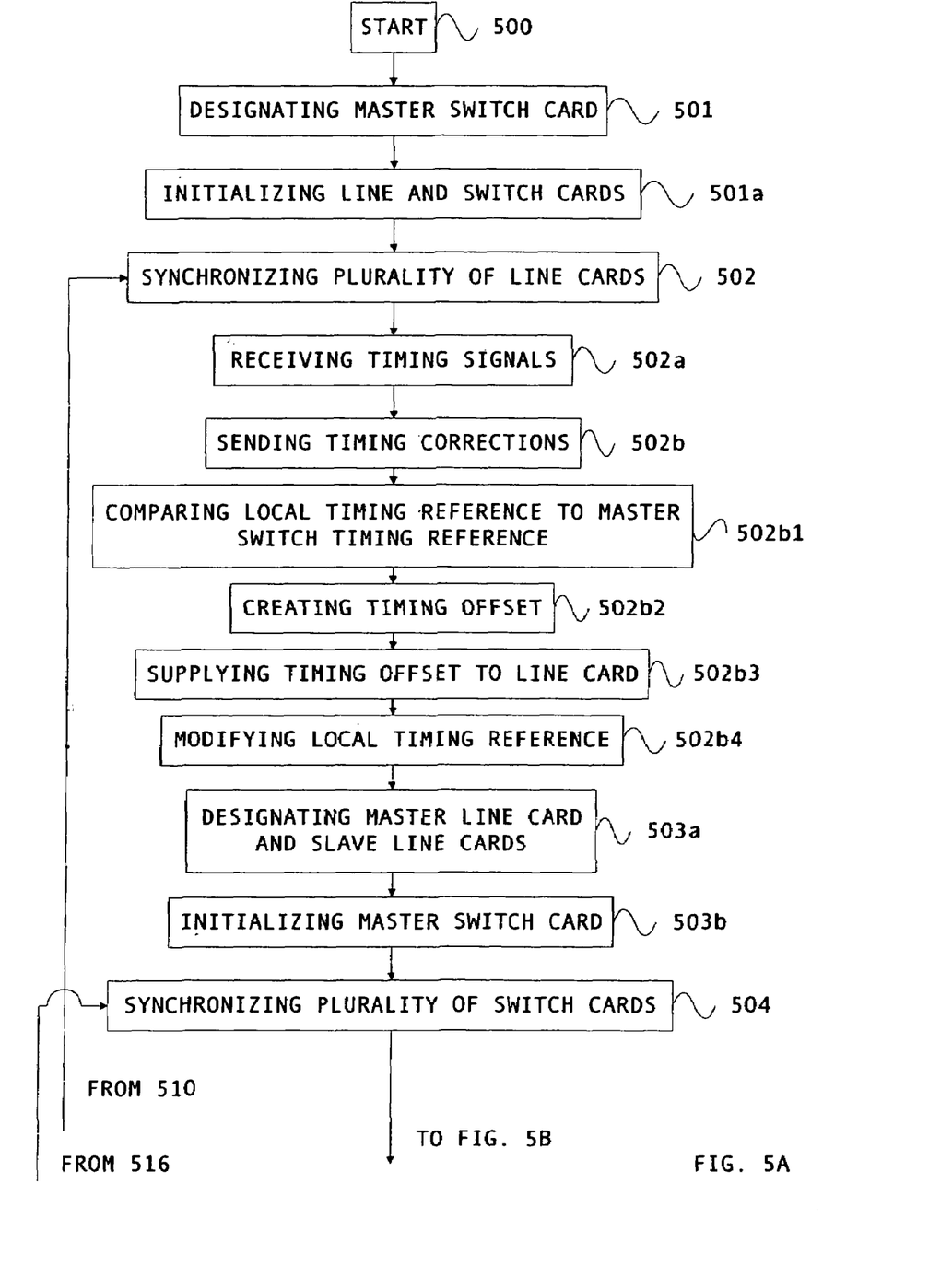
FIGS. 5a and 5b are a flowchart depicting a method for synchronizing timing in a broadband switch.
Figure 5B:
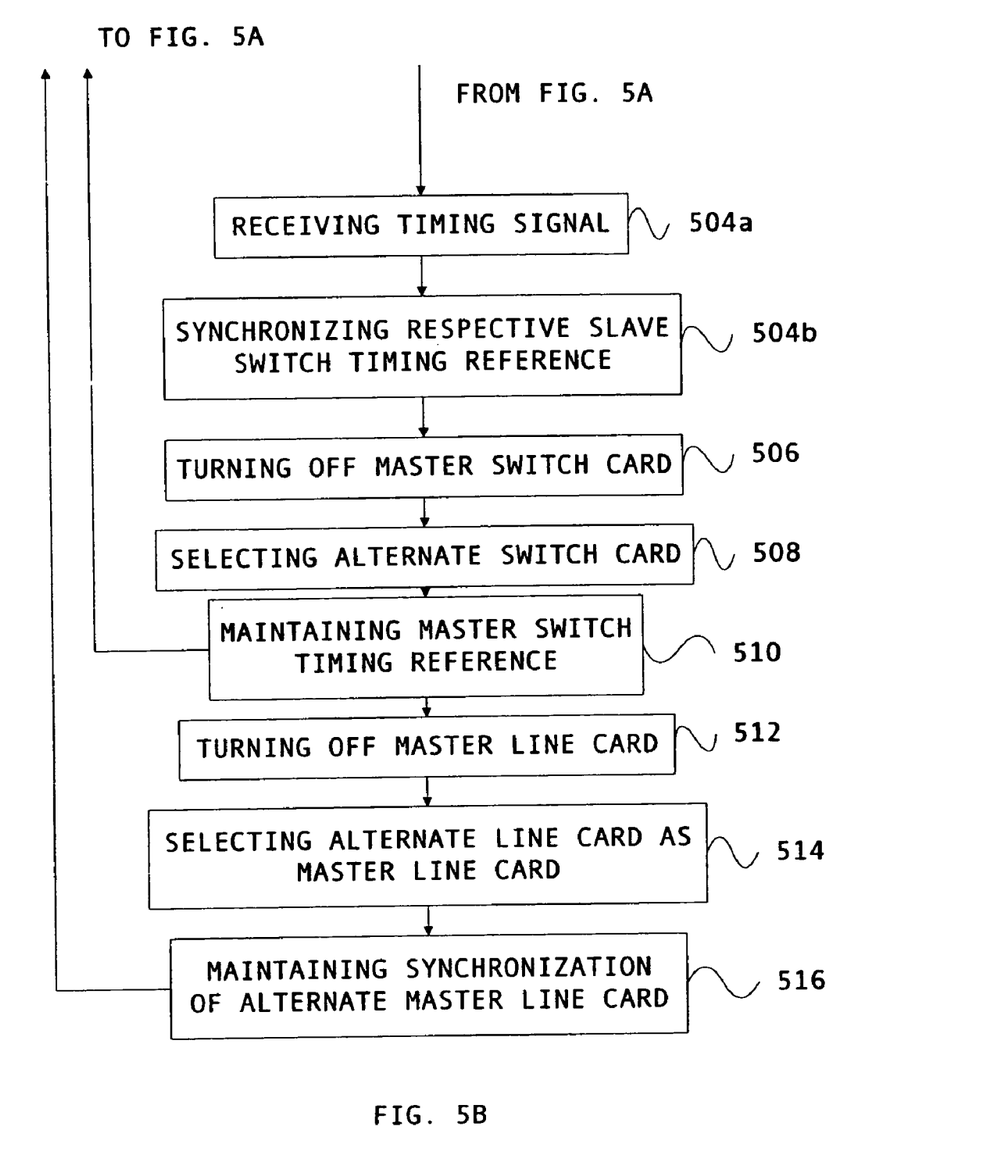

FIGS. 5a and 5b are a flowchart depicting a method for synchronizing timing in a broadband switch. Although the method is depicted as a series of numbered steps for clarity, no order should be inferred from the numbering unless explicitly stated. The method begins with Step 500. Step 502 synchronizes a plurality of line cards for transceiving information packets. Step 504 synchronizes a plurality of switch cards controlling the distribution of the information packets, in response to communications with the line cards.

Step 501, from the plurality of switch cards, designates a master switch card, having a master switch timing reference, and slave switch cards. Synchronizing a plurality of line cards in Step 502 includes synchronizing line cards to the master switch timing reference in response to communications with the master switch card.

Step 503a designates a master line card and slave line cards from the plurality of line cards. Synchronizing a plurality of switch cards in response to communications with the line cards in Step 504 includes synchronizing the slave switch cards to the master switch timing reference in response to communications with the master line card.

In some aspects of the invention, synchronizing a plurality of switch cards in response to communications with the line cards in Step 504 includes establishing exclusive communications between the switch cards and the line cards. That is, timing synchronization communications are prohibited between the switch cards. In some aspects of the invention, synchronizing line cards to the master switch timing reference in response to communications with the master switch card in Step 502 includes prohibiting communications between the line cards. Alternately stated, Step 502 includes establishing exclusive communications between the switch cards and the line cards.

Synchronizing line cards in response to communications with the master switch card includes sub-steps. Step 502a receives timing signals at the master switch card from each of the line cards. Step 502b sends timing corrections from the master switch card to each of the line cards.

In some aspects of the invention, receiving timing signals at the master switch card from each of the line cards in Step 502a includes the master switch card receiving a timing signal including a local timing reference from each of the line cards.

Sending timing corrections from the master switch card to the line cards includes sub-steps. Step 502b1 compares the local timing reference from each line card to the master switch timing reference. Step 502b2 creates a timing offset between each local timing reference and the master switch timing reference. In Step 502b3 the master switch card supplies each timing offset to its respective line card. In Step 502b4 each line card modifies its local timing reference in response to receiving its respective timing offset.

Synchronizing the slave switch cards to the master switch timing reference in response to communications with the master line card includes sub-steps. In Step 504a each slave switch card receives a timing signal, with a local timing reference synchronized to the master switch timing reference from the master line card. In Step 504b each slave switch card synchronizes its respective slave switch timing reference to the received local timing reference.

In Steps 502 and 504 each switch and line section generates a timing reference that is the overflow count in the cyclical generation of a first predetermined number at a first predetermined rate. Designating a master switch card having a master switch timing reference in Step 503a includes using the master switch card overflow count as the master switch timing reference. Comparing local timing references, from a plurality of line cards, to the master switch timing reference in Step 502b1 includes comparing the master switch count to each of the line card overflow counts. Creating a timing offset between each local timing reference and the master switch timing reference in Step 502b2 includes measuring the difference between each line card overflow count and the master switch card count. Supplying timing offsets to each of the line cards in Step 502b3 includes supplying each line card with the differences between its respective overflow count and the master switch card count. Each of the plurality of line cards modifying its local timing reference in response to receiving its respective timing offset in Step 502b4 includes each line card adding the its respective overflow count difference to its count.

Each slave switch card receiving a timing signal, with a local timing reference synchronized to the master switch timing reference, in Step 504a includes each slave switch card receiving a signal with an overflow count synchronized to the master switch count. Each slave switch card synchronizing its respective slave switch timing reference to the received local timing reference in Step 504b includes each slave switch card synchronizing its respective count to the master line card overflow count.

Step 501a initializes the line and switch cards. Step 503b initializes the master switch card master switch timing reference. Synchronizing the slave switch cards in Step 504 includes synchronizing the line cards to the initialized master switch card master timing reference.

Upon failure of the master switch card, Step 506 turns off the master switch card following the synchronization the plurality of switch cards. Step 508 selects an alternate switch card as the master switch card from the plurality of slave switch cards. Step 510 maintains the master switch timing reference with the alternate master switch card. Synchronizing the plurality of line cards in Step 502 includes maintaining the synchronization of the line cards using the alternate master switch card master switch timing reference.

Upon a failure of the master line card, Step 512 turns off the master line card following the synchronizing of the plurality of switch cards. Step 514 selects an alternate line card as the master line card from the plurality of slave line cards. Step 516 maintains the synchronization of the alternate master line card timing reference to the master switch card clock. Synchronizing the plurality of switch cards in Step 504 includes maintaining the synchronization of the slave switch cards to the alternate master line card.

The invention has been described above in the context of an eight cycle clock and a binary eight counter. However, the specific of the counting process where given merely as an illustration. Likewise, the format of the signals used to communicate the local timing reference need not be the same as presented above. More critical to the invention is the fact that the line counters send timing information to the master line card, and the master switch card sends information to the line switch cards to correct their timing to match the master switch card. In another embodiment of the invention a master line card is not used. The slave switch cards are able to synchronize timing in response to communications with any line card. Other variations and embodiments to accomplish this fundamental task will occur to those skilled in the arts.

What is claimed is:

1. A method for synchronizing timing in a broadband switch that includes a plurality of line cards for transceiving information packets and a plurality of switch cards for controlling distribution of the information packets between the line cards, the method comprising:

from the plurality of switch cards, designating a master switch card having a master switch timing reference and slave switch cards;

from the plurality of line cards, designating a master line card and slave line cards;

synchronizing the plurality of line cards; and synchronizing the plurality of switch cards in response to communications with the line cards;

wherein synchronizing the plurality of line cards includes synchronizing line cards to the master switch timing reference in response to communications with the master switch card; and wherein synchronizing the plurality of switch cards in response to communications with the line cards includes:

synchronizing the slave switch cards to the master switch timing reference in response to communications with the master line card; and establishing communications exclusively between the switch cards and the line cards.

2. The method of claim 1 wherein synchronizing line cards to the master switch timing reference in response to communications with the master switch card includes prohibiting communications between the line cards.

3. The method of claim 1 wherein synchronizing line cards in response to communications with the master switch card includes:

receiving timing signals at the master switch card from each of the line cards; and sending timing corrections from the master switch card to each of the line cards.

4. The method of claim 3 wherein receiving timing signals at the master switch card from each of the line cards includes the master switch card receiving a timing signal including a local timing reference from each of the line cards.

5. The method of claim 4 wherein sending timing corrections from the master switch card to the line cards includes:

comparing the local timing reference from each line card to the master switch timing reference;

creating a timing offset between each local timing reference and the master switch timing reference;

the master switch card supplying each timing offset to its respective line card; and each line card modifying its local timing reference in response to receiving its respective timing offset.

6. The method of claim 5 wherein synchronizing the slave switch cards to the master switch timing reference in response to communications with the master line card includes:

each slave switch card receiving a timing signal, with a local timing reference synchronized to the master switch timing reference, from the master line card; and each slave switch card synchronizing its respective slave switch timing reference to the received local timing reference.

7. The method of claim 6 wherein each switch and line card generates a timing reference that is the overflow count in the cyclical generation of a first predetermined number at a first predetermined rate;

wherein designating a master switch card having a master switch timing reference includes using the master switch card overflow count as the master switch timing reference;

wherein comparing the local timing references from each line cards to the master switch timing reference includes comparing the master switch count to each of the line card overflow counts;

wherein creating a timing offset between each local timing reference and the master switch timing reference includes measuring the difference between each line card overflow count and the master switch card count;

wherein supplying timing offsets to each of the respective line cards includes supplying each line card with the differences between its respective overflow count and the master switch card count; and wherein each of the plurality of line cards modifying its local timing reference in response to receiving its respective timing offset includes each line card adding the its respective overflow count difference to its count.

8. The method of claim 7 wherein each slave switch card receiving a timing signal, with a local timing reference synchronized to the master switch timing reference includes each slave switch card receiving a signal with an overflow count synchronized to the master switch count; and wherein each slave switch card synchronizing its respective slave switch timing reference to the received local timing reference includes each slave switch card synchronizing its respective count to the master line card overflow count.

9. The method of claim 6 further comprising:

initializing the line and switch cards;

initializing the master switch card master switch timing reference; and wherein synchronizing the slave switch cards includes synchronizing the line cards to the initialized master switch card master timing reference.

10. The method of claim 6 further comprising:

following the synchronization the plurality of switch cards, turning off the master switch card, selecting an alternate switch card as the master switch card from the plurality of slave switch cards;

maintaining the master switch timing reference with the alternate master switch card; and wherein synchronizing the plurality of line cards includes maintaining the synchronization of the line cards using the alternate master switch card master switch timing reference.

11. The method of claim 6 further comprising:

following the synchronizing of the plurality of switch cards, turning off the master line card, selecting an alternate line card as the master line card from the plurality of slave line cards;

maintaining the synchronization of the alternate master line card timing reference to the master switch card clock; and wherein synchronizing the plurality of switch cards includes maintaining the synchronization of the slave switch cards to the alternate master line card.

12. A system for synchronizing switch timing, the system comprising:

a plurality of line cards, each line card having an information port to transmit and receive information packets and a control port to accept commands for controlling the distribution of the information packets, each line card maintaining synchronization in response to timing signals communicated through the control port; and a plurality of switch cards, each switch card having a control port connected to the plurality of line cards to send information packet control commands, each switch card maintaining synchronization in response to timing signal communications with the line cards through the control port;

the plurality of switch cards including a master switch card having a master switch timing reference and slave switch cards; and the line cards maintaining synchronization in response to timing signal communications with the master switch card;

wherein the plurality of line cards include a master line card and slave line cards;

wherein the slave switch cards maintain synchronization in response to timing signal communications with the master line card; and wherein the switch card control ports are connected exclusively to line card control ports.

13. The system of claim 12 wherein the master switch card receives timing signals from each of the line cards, and sends timing corrections to the line cards.

14. The system of claim 13 wherein the master switch card receives a timing signal including a local timing reference from each of the line cards.

15. The system of claim 14 wherein the master switch card compares the local timing reference from a line card to the master switch timing reference, creates a timing offset between the local timing reference and the master switch timing reference, and supplies the timing offset in a timing signal to the line card; and wherein the line card modifies its local timing reference in response to receiving the timing signal with the timing offset from the master switch card.

16. The system of claim 15 wherein each slave switch cards receives a timing signal, with a local timing reference synchronized to master switch timing reference, from the master line card, with each slave switch card adopting the local timing reference of the master line card as the slave switch timing reference.

17. The system of claim 16 wherein each switch card includes a counter to generate a timing reference that is the overflow count of a first predetermined number at a first predetermined rate;

wherein each line card includes a counter to generate a timing reference that is the overflow count of a first predetermined number at a first predetermined rate;

wherein the master switch card uses its overflow count as the master switch timing reference, compares its count to each line card overflow count, measures the difference between each line card overflow count and the master switch count, and supplies each line card its respective measured difference as the timing offset; and wherein each line card adds its respective measured difference to its counter.

18. The system of claim 16 wherein the line cards are initialized;

wherein the switch cards are initialized;

wherein the master switch card counter is initialized; and wherein the line cards are synchronizing with timing signal communications responsive to the initialized master switch card counter.

19. The system of claim 16 further comprising:

wherein the master switch card is turned off after synchronizing the line cards;

wherein an alternate switch card is selected as the master switch card from the plurality of slave switch cards, and maintains the master switch timing reference; and wherein the plurality of line cards maintain synchronization in response to timing signal communications with the alternate master switch card.

20. The system of claim 16 wherein the master line card is turned off after synchronizing the slave switch cards;

wherein an alternate line card is selected as the master line card from the plurality of slave line cards, and maintains synchronization with the master switch card; and wherein the slave switch cards maintain synchronization in response to timing signal communications with the alternate master line card.

* * * * *